US 8,291,345 B2

(12) United States Patent
Howard (10) Patent No.: US 8,291,345 B2
(45) Date of Patent: Oct. 16, 2012

(54) SUN-SHADOW SIMULATION IN A GEOSPATIAL SYSTEM

(75) Inventor: Richard D. Howard, Kentfield, CA (US)

(73) Assignee: Autodesk, Inc., San Rafael, CA (US)

(*) Notice: Subject to any disclaimer, the term of this patent is extended or adjusted under 35 U.S.C. 154(b) by 967 days.

(21) Appl. No.: 12/245,568

(22) Filed: Oct. 3, 2008

(65) Prior Publication Data

US 2009/0094557 A1   Apr. 9, 2009

Related U.S. Application Data

(60) Provisional application No. 60/997,868, filed on Oct. 5, 2007.

(51) Int. Cl.
   *G06F 3/048* (2006.01)
(52) U.S. Cl. .................................................. 715/848
(58) Field of Classification Search .................. 715/848
   See application file for complete search history.

(56) References Cited

U.S. PATENT DOCUMENTS

| 6,018,350 | A | * | 1/2000 | Lee et al. ................ 345/426 |
| 6,147,686 | A | | 11/2000 | Brown et al. |
| 6,339,429 | B1 | * | 1/2002 | Schug ..................... 345/589 |
| 6,915,310 | B2 | | 7/2005 | Gutierrez et al. |
| 7,058,896 | B2 | | 6/2006 | Hughes |
| 7,170,510 | B2 | | 1/2007 | Kawahara et al. |
| 7,181,362 | B2 | * | 2/2007 | Ratti et al. .............. 702/152 |
| 7,263,667 | B1 | | 8/2007 | Hoellerer et al. |
| 7,528,938 | B2 | | 5/2009 | Garceau et al. |
| 7,567,844 | B2 | * | 7/2009 | Thomas et al. ............. 700/19 |
| 7,693,702 | B1 | | 4/2010 | Kerner et al. |
| 7,710,418 | B2 | * | 5/2010 | Fairclough ............... 345/426 |
| 7,865,836 | B1 | | 1/2011 | Sperlongano et al. |
| 2003/0057887 | A1 | * | 3/2003 | Dowling et al. .......... 315/291 |
| 2005/0091596 | A1 | * | 4/2005 | Anthony et al. ........... 715/712 |
| 2005/0110788 | A1 | | 5/2005 | Turner et al. |
| 2005/0223337 | A1 | | 10/2005 | Wheeler et al. |
| 2006/0075356 | A1 | | 4/2006 | Faulkner et al. |
| 2006/0176303 | A1 | * | 8/2006 | Fairclough ............... 345/426 |
| 2006/0209061 | A1 | | 9/2006 | Burch et al. |
| 2007/0132779 | A1 | | 6/2007 | Gilbert |

(Continued)

OTHER PUBLICATIONS

International Search Report mailed Aug. 12, 2008, International application No. PCT/US2008/078797, International filing date Mar. 10, 2008.

(Continued)

*Primary Examiner* — William Bashore
*Assistant Examiner* — Henry Orr
(74) *Attorney, Agent, or Firm* — Gates & Cooper LLP (57) ABSTRACT

A method, apparatus, and article of manufacture provide the ability to display a sun and shadow simulation in a 3D system. A 3D view of a real world scene is displayed, using a 3D graphics application, on a display device. A plug-in is installed into the application. A calendar period (e.g., a month, day, and year) is defined by the user. A timeline arc is displayed with the calendar period defining a radius of the arc, and starting stopping endpoints of the timeline arc defining an interval of time during the calendar period. A timeline slider is displayed on the arc that indicates a time of day within the calendar period. A visualization is displayed, in the 3D view, of shadows cast by a sun on objects in the 3D view. A position of the sun is based on the calendar period and the time of day.

21 Claims, 10 Drawing Sheets

U.S. PATENT DOCUMENTS

| | | | |
|---|---|---|---|
| 2007/0143345 | A1 | 6/2007 | Jones et al. |
| 2007/0150198 | A1* | 6/2007 | MacDonald .................. 702/2 |
| 2007/0176926 | A1* | 8/2007 | Garcia et al. ................ 345/426 |
| 2007/0219645 | A1* | 9/2007 | Thomas et al. ............... 700/29 |
| 2008/0016472 | A1 | 1/2008 | Rohlf et al. |
| 2008/0140271 | A1 | 6/2008 | Garceau et al. |
| 2008/0215414 | A1 | 9/2008 | Fehnel et al. |
| 2008/0292213 | A1 | 11/2008 | Chau |
| 2009/0019366 | A1 | 1/2009 | Abhyanker |
| 2009/0094556 | A1* | 4/2009 | Howard et al. .............. 715/848 |
| 2010/0164974 | A1* | 7/2010 | Fairclough .................. 345/582 |
| 2011/0279470 | A1* | 11/2011 | Fairclough .................. 345/582 |

OTHER PUBLICATIONS

Clausters, Luc; Romain, Cyril; Sanchez, David; 9. Interactive Authoring of Interactive Stories, Datasheet [online], inScape storytelling, Feb. 2006, version 2.0 (retrieved on Nov. 20, 2008). Retrieved from the Internet: <URL: http://www.inscapers.com/pdfs/9_authoring.pdf>, pp. 102-224.

Oh, John Kie Whan; Haberl, Jeff S.; "New MS-Windows-Based Educational Software for Teaching the Sunpath Diagram and Shading Mask Protractor". Energy Systems Laboratory, Department of Architecture, Texas A&M University, College Station; May 13-14, 1996; pp. 262-268.

Kie et al., "New MS-Windows-Based Educational Software for Teaching the Sunpath Diagram and Shading Mask Protractor," Conference Proceedings (online), 1996, retrieved from the internet on Nov. 24, 2008, http://repository.tamu.edu/bitstream/handle/1969.1/6694/ESL-HH-96-05-30.pdf?sequence=1.

Office Action of U.S. Appl. No. 12/245,562 mailed Aug. 18, 2011.

Amendment Under 37 C.F.R. 1.111 of U.S. Appl. No. 12/245,562 e-filed Nov. 17, 2011.

Office Action of U.S. Appl. No. 12/286,911 mailed Jun. 10, 2011.

Amendment Under 37 C.F.R. 1.111 of U.S. Appl. No. 12/286,911 e-filed Sep. 12, 2011.

Final Office Action mailed Dec. 22, 2011 from U.S. Appl. No. 12/286,911.

Amendment filed on Feb. 22, 2012 in U.S. Appl. No. 12/286,911.

Toolglass and Magic Lenses: The See Through Interface; by EA Bier et al.—1993—Cited by 1066—Related articles, Eric A. Bier, Xerox PARC, 3333 Coyote Hill Road, Palo Alto, CA 94304, University of Toronto, University of Washington.

Final Office Action for U.S. Appl. No. 12/245,562, dated Feb. 23, 2012.

Office Action for U.S. Appl. No. 12/286,911, dated Apr. 5, 2012.

Advisory Action dated May 4, 2012.

Amendment 1.116 efiled Apr. 23, 2012.

International Search Report and Written Opinion of the International Searching Authority for application No. PCT/US08/78795 mailed Dec. 5, 2008.

International Search Report and Written Opinion of the International Searching Authority for application No. PCT/US08/78797 mailed Dec. 8, 2008.

* cited by examiner

SUN-SHADOW SIMULATION IN A GEOSPATIAL SYSTEM

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 60/997,868, filed Oct. 5, 2007, by RICHARD D. HOWARD, JARROD LOPICCOLO, GRANT ANDERSON, ROY LINDAUER, THOMAS HELMAN, and MATTHEW LARSEN, entitled "FRAMEWORK FOR AGGREGATING DESIGN MODELS AND GIS DATA IN A GEOSPATIAL ENVIRONMENT,"

This application is related to the following co-pending and commonly-assigned patent application, which application is incorporated by reference herein:

U.S. patent application Ser. No. 12/245,562, entitled "USER DEFINED SCENARIOS IN A THREE DIMENSIONAL GEO-SPATIAL SYSTEM", by Richard D. Howard, Jarrod Lopiccolo, Grant Anderson, Roy Lindauer, Thomas Helman, and Matthew Larsen, filed Oct. 3, 2008; and U.S. patent application Ser. No. 12/286,911, entitled "VIEWPORT OVERLAYS TO EXPOSE ALTERNATE DATA REPRESENTATIONS", by Richard D. Howard, filed Oct. 3, 2008.

BACKGROUND OF THE INVENTION

1. Field of the Invention

The present invention relates generally to three-dimensional (3D) applications, and in particular, to a method, apparatus, and article of manufacture for a producing a sun/shadow simulation while directly controlling sun/shadow settings for the time of day and day of year.

2. Description of the Related Art

Geographic information systems (GIS) are commonly used and generally refer to an information system that integrates hardware, software and data in order to capture, store, analyze, manage, and display/present data that is spatially referenced (i.e., linked to location or is geographically referenced). GIS systems commonly provide a two dimensional (2D) visualization of data in the form of maps, globes, reports, and charts. However, prior art GIS systems fail to provide the capability to merge GIS data with additional information in order to visualize, analyze, and simulate trends, phenomena, states, and events. Further, three-dimensional (3D) systems also fail to provide such capabilities.

In addition, prior art systems fail to provide the ability for a user to easily visualize how the sun and shadow produced by objects in a 3D environment. Prior art systems further fail to provide the ability to directly control the sun/shadow settings for time of day and day of year in such a visualization.

SUMMARY OF THE INVENTION

Certain cities may have regulations that prohibit shadows from being cast on neighboring buildings. Alternatively, users may desire to view the effect of the sun on a building when designing the placement or architecture of the building.

One or more embodiments of the invention allow a user to specify a location of a building as well as a particular time and date. Thereafter the user can view the building from different perspectives under the simulated sun position and shadows cast as a result. The user has the ability to specify time and date and view it visually. Further, the user can grab an icon of an arc representing the sun position on the date set (e.g., summer solstice) and can view the shadow cast at each time during the day. The user can also grab a point on the arc and drag it to adjust the date (e.g., to switch to the winter solstice). Thereafter, the use can simply press a play button that initiates a visual representation of the shadow and sun that is cast as an icon moves across the arc.

In one or more embodiments, the user can view any direction and swing around to see the sun/shadow from a different viewpoint. Further, the user can turn off the textures in a displayed scene to view the scene in black and white or without the building and surrounding area details.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention provide an application and development framework for aggregating design models and GIS data within an immersive 3D geospatial environment for the purposes of visualizing, analyzing, and simulating trends, phenomena, state, and events in ways that are not possible within conventional 2D GIS or existing 3D application software. In other words, embodiments of the invention provide the ability to view, analyze, simulate trends, phenomena, states, and events in a digital city.

The benefits of the embodiments of the invention include:

3D Geospatial Environment containing both simplified and fully textured rendition based on high resolution lidar and ortho-photography for content such as Digital Terrain Models, Streets and Roadways, Water Features, Railways, Buildings, Utility Infrastructure, and Street Furniture;

Importation, storage, and data mapping of full 3D design models from various software (e.g., software available from the assignee of the present invention including AutoCAD™, Map3D™, Revit™, Architecture™, Civil3D™, and Inventor™, as well as support for GIS formats via Autodesk™ Feature Data Objects (FDO)™ technology);

Real-time 3D rendering and animation including transparency, reflections, lights, shadows, and atmospheric effects;

Smooth motion control and 6-axis navigation;

Object visibility, stylization, and transparency for all content;

Linking to tabular information and ODBC data sources;

Ability to pply local override of any model, data, or visualization attribute or setting;

A plug-in architecture for analysis and simulation modules;

An online catalog that provides search, download, and immediate use of models, data, and plug-ins;

"What If" scenario creation using a combination of models, data, plug-ins, and overrides;

Tabular reports and charting of data values; and

Publishing of specific scenarios for viewing on the web.

Hardware and Software Environment

Figure 1:
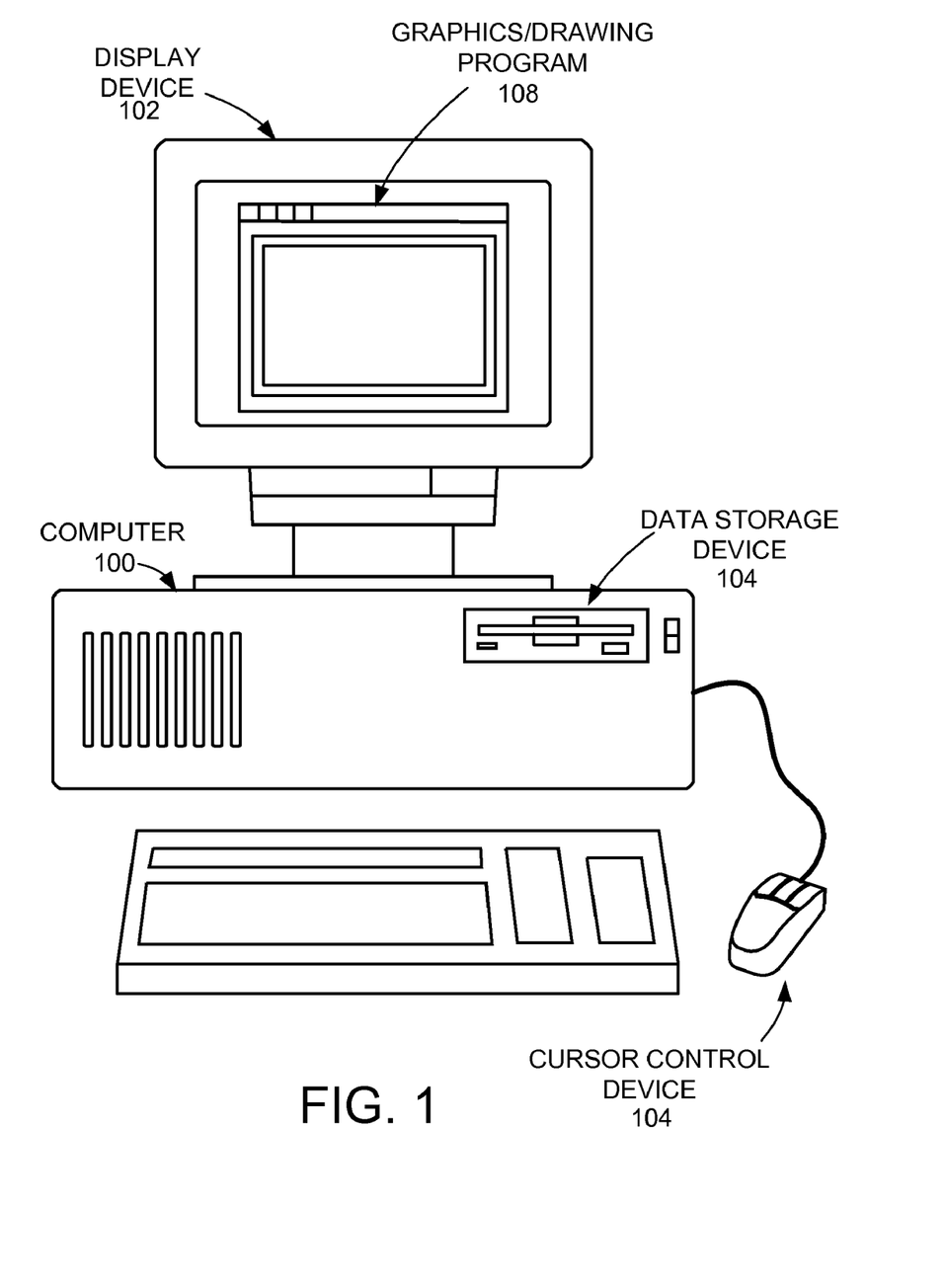
FIG. 1 is an exemplary hardware and software environment used to implement one or more embodiments of the invention.

FIG. 1 is an exemplary hardware and software environment used to implement one or more embodiments of the invention. Embodiments of the invention are typically implemented using a computer 100, which generally includes, inter alia, a display device 102, data storage devices 104, cursor control devices 106, and other devices. Those skilled in the art will recognize that any combination of the above components, or any number of different components, peripherals, and other devices, may be used with the computer 100.

One or more embodiments of the invention are implemented by a computer-implemented graphics program 108, wherein the graphics program 108 is represented by a window displayed on the display device 102. Generally, the graphics program 108 comprises logic and/or data embodied in or readable from a device, media, carrier, or signal, e.g., one or more fixed and/or removable data storage devices 104 connected directly or indirectly to the computer 100, one or more remote devices coupled to the computer 100 via a data communications device, etc.

In one or more embodiments, instructions implementing the graphics program 108 are tangibly embodied in a computer-readable medium, e.g., data storage device 104, which could include one or more fixed or removable data storage devices, such as a zip drive, floppy disc drive, hard drive, CD-ROM drive, DVD drive, tape drive, etc. Further, the graphics program 108 is comprised of instructions which, when read and executed by the computer 100, causes the computer 100 to perform the steps necessary to implement and/or use the present invention. Graphics program 108 and/or operating instructions may also be tangibly embodied in a memory and/or data communications devices of computer 100, thereby making a computer program product or article of manufacture according to the invention. As such, the terms "article of manufacture" and "computer program product" as used herein are intended to encompass a computer program accessible from any computer readable device or media.

Figure 2:
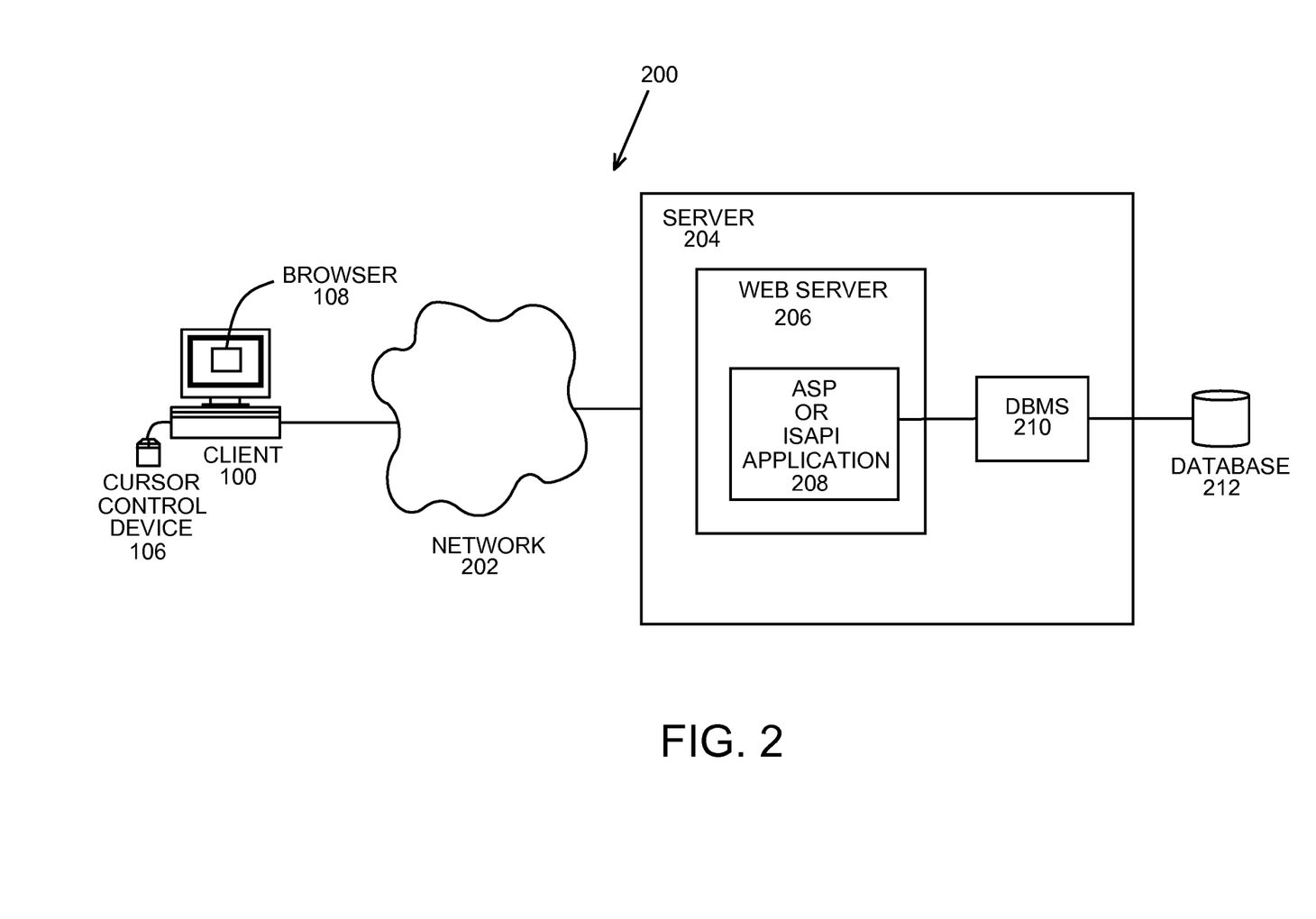
FIG. 2 schematically illustrates a further hardware and software environment in accordance with one or more embodiments of the invention.

FIG. 2 schematically illustrates a further hardware and software environment in accordance with one or more embodiments of the invention, and more particularly, illustrates a typical distributed computer system 200 using a network 202 to connect client computers 100 to server computers 204. A typical combination of resources may include a network 202 comprising the Internet, LANs (local area networks), WANs (wide area networks), SNA (systems network architecture) networks, or the like, clients 100 that are personal computers or workstations (e.g., as described above), and servers 204 that are personal computers, workstations, minicomputers, or mainframes. Additionally, both client 100 and server 204 may receive input (e.g., cursor location input) and display a cursor in response to an input device such as cursor control device 106.

A network 202 such as the Internet connects clients 100 to server computers 204. Additionally, network 202 may utilize radio frequency (RF) to connect and provide the communication between clients 100 and servers 204. Clients 100 may execute a client application or Web browser 108 (e.g., as described above) and communicate with server computers 204 executing Web servers 206. The software executing on clients 100 may be downloaded from server computer 204 to client computers 100 and installed as a plug in or ActiveX control of a Web browser. Accordingly, clients 100 may utilize ActiveX components/component object model (COM) or distributed COM (DCOM) components to provide a user interface on a display of client 100.

Web server 206 may host an Active Server Page (ASP) or Internet Server Application Programming Interface (ISAPI) application 208, which may be executing scripts. The scripts invoke objects that execute business logic (referred to as business objects). The business objects then manipulate data in database 212 through a database management system (DBMS) 210. Alternatively, database 212 may be part of or connected directly to client 100 instead of communicating/obtaining the information from database 212 across network 202. When a developer encapsulates the business functionality into objects, the system may be referred to as a component object model (COM) system. Accordingly, the scripts executing on web server 206 (and/or application 208) invoke COM objects that implement the business logic. Further, server 204 may utilize Microsoft's Transaction Server (MTS)™ to access required data stored in database 212 via an interface such as ADO (Active Data Objects), OLE DB (Object Linking and Embedding DataBase), or ODBC (Open DataBase Connectivity).

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby.

Computer-Implemented Graphics Program

Figure 3:
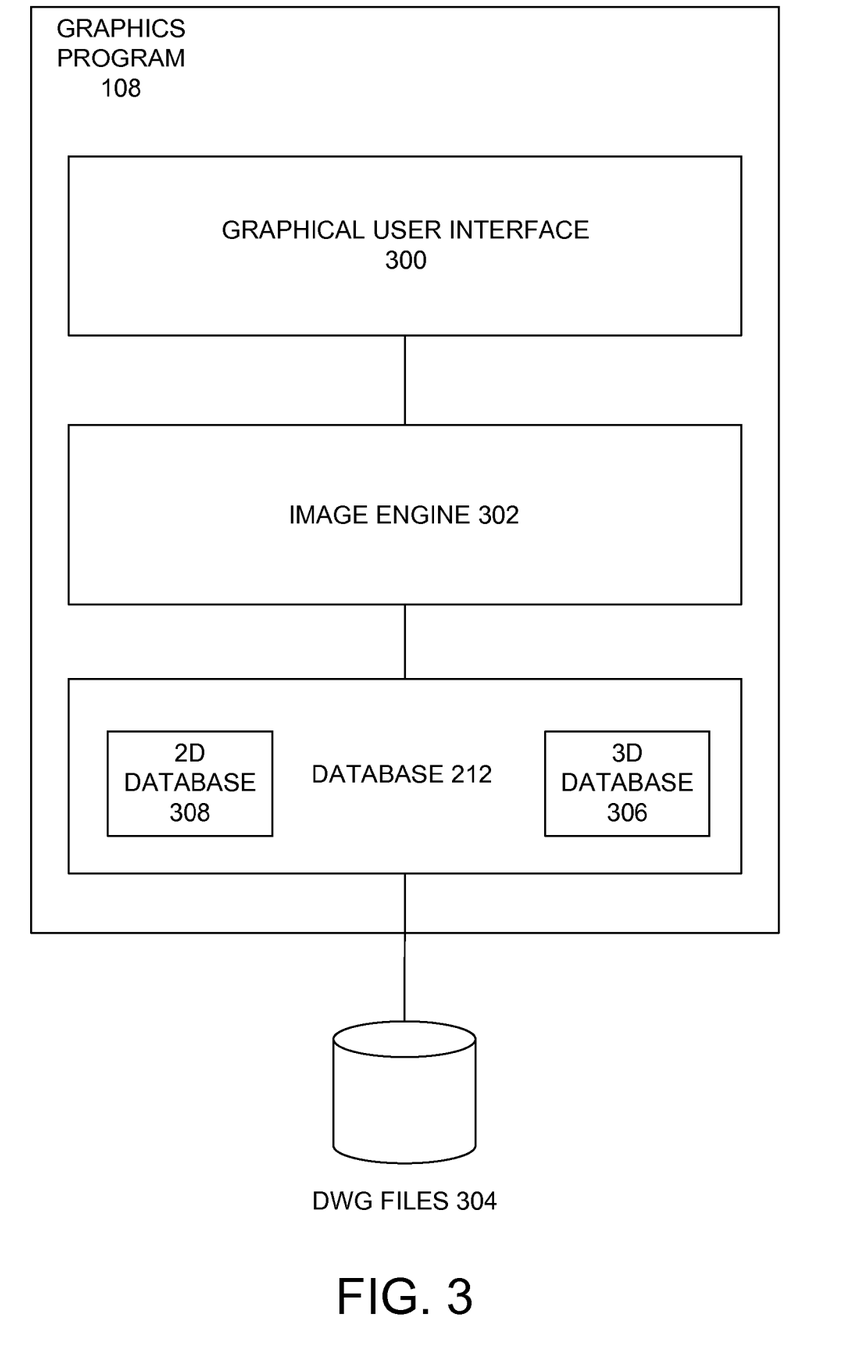
FIG. 3 is a block diagram that illustrates the components of the graphics program of FIG. 2 in accordance with one or more embodiments of the invention.

FIG. 3 is a block diagram that illustrates the components of the graphics program 108 in accordance with one or more embodiments of the invention. There are three main components to the graphics program 108, including: a Graphical User Interface (GUI) 300, an Image Engine (IME) 302, and a DataBase (DB) 212 for storing objects in Drawing (DWG) files 304.

The Graphical User Interface 300 displays information to the operator and provides the functionality for the operator's interaction with the graphics program 108.

The Image Engine 302 processes the DWG files 304 and delivers the resulting graphics to the monitor 102 for display. In one or more embodiments, the Image Engine 302 provides a complete application programming interface (API) that allows other computer programs to interface to the graphics program 108 as needed.

The Database 212 is comprised of two separate types of databases: (1) a 3D database 306 known as the "3D world space" that stores 3D information; and (2) one or more 2D databases 308 known as the "2D view ports" that stores 2D information derived from the 3D information.

As used herein, the graphics program 108 may consist of a variety of different type of applications including GIS, CAD (computer aided design), solid modeling systems, animation products, rendering systems, etc. Embodiments of the invention are not limited to those software applications explicitly described herein but by the limitations set forth in the claims.

Plug-In Modules

Embodiments of the invention provide an architecture and method of using plug-in modules for user defined 3D/4D visualization, analysis, and simulation. Users/clients 100 are provided with the ability to search for, download, and immediately use plug-ins from an online catalog offered by one or more servers 204. These plug-ins can be supplied by software developers and enable users 100 to visualize, analyze, and simulate trends, phenomena, state, and events via software application 108.

Such a plug-in environment allows many different types of applications 108 to load specific data types and allows interaction between those data types. Most "traditional" plug-in environments do not allow this. Plug-ins for different data types may include textures, 3D models, 2D models, particle systems, and geo-based behavior systems (behaviors based on specific geo information).

Another advantage of the plug-in architecture is that it allows user to load models seamlessly without having to go through the lengthy steps of importing files. Accordingly, a full 3D environment and real-time rendering capability of embodiments of the invention combined with the analytic capabilities supplied by a plug-in developer allows user to visualize their data in ways not formerly possible.

Plug-ins are loaded and associated with specific models and scenarios within the digital city of embodiments of the invention. A user can override model and linked data values, enter plug-in parameters, and control the visualization of results. Plug-ins have the ability to automatically add themselves or make calculations based on the data of a particular file making up a digital city environment.

For example, based on GIS fault data, an earthquake preparedness drill particle system could be suggested and/or instantiated. Another example would be a recommended parking configuration based on the number of roads, or total lanes adjacent to a particular structure. Alternatively, a road configuration could be suggested based on the parking structures and parking places in a given city block.

Figure 4:
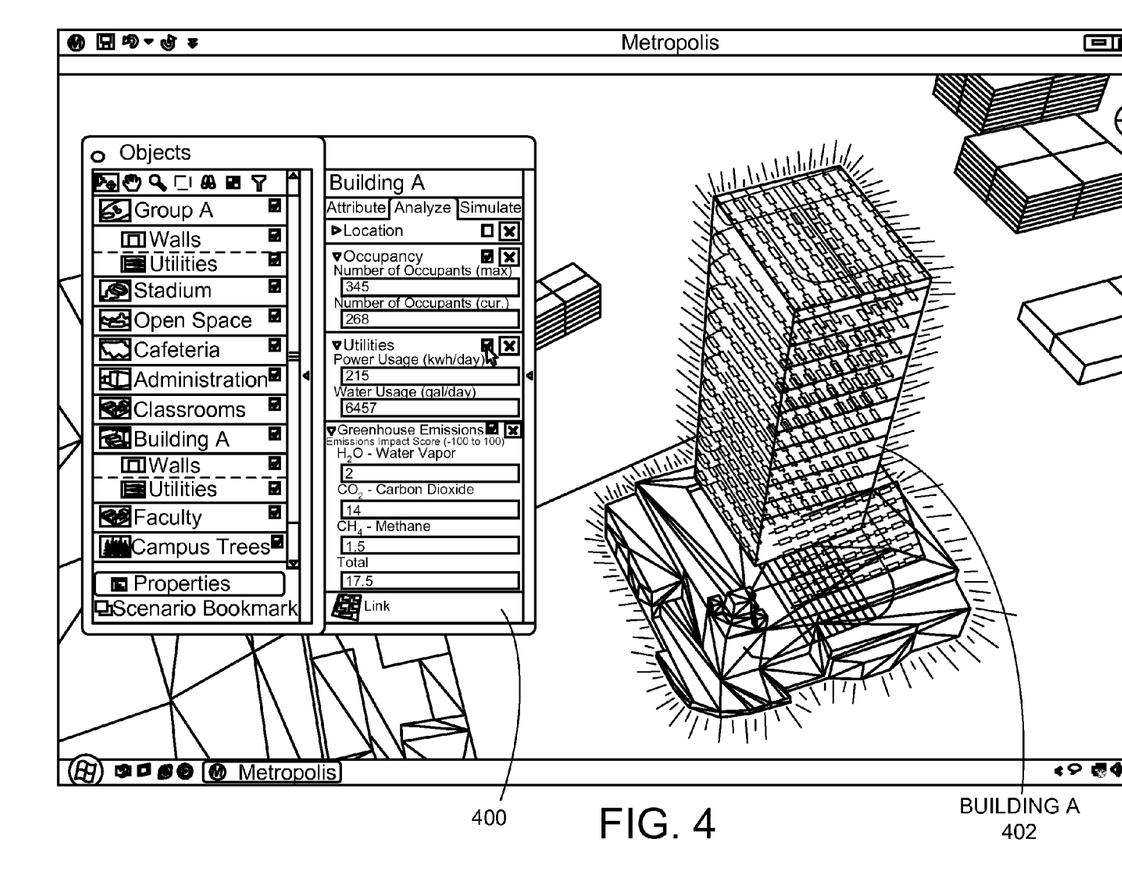
FIG. 4 illustrates an example panel containing multiple plug-ins in accordance with one or more embodiments of the invention.

FIG. 4 illustrates an example panel containing multiple plug-ins. As illustrated, there is a location plug-in, a utilities plug-in, and a greenhouse emissions plug-in. Each plug-in can interact with data established in other plug-ins and use such data in conducting calculations. Panel 400 of FIG. 4 illustrates the resulting display when three plug-ins are utilized together to analyze greenhouse gas emissions based on building occupancy and utility consumption for a selected building in accordance with one or more embodiments of the invention. Panel 400 allows the user to set various options in the various plug-ins for analyzing the green house emissions of building A 402.

Figure 5:
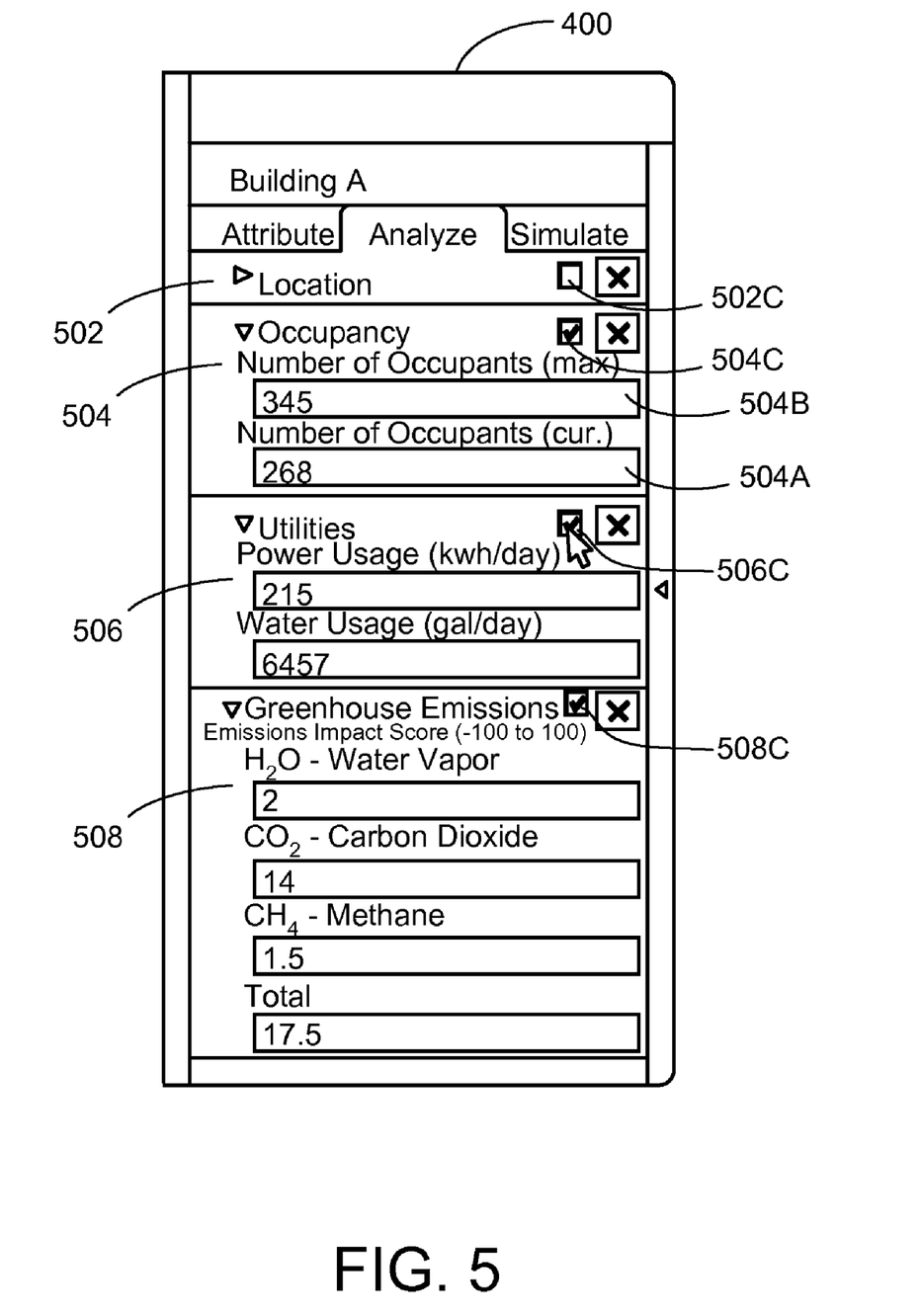
FIG. 5 is an enlargement of a panel of FIG. 4 illustrating several plug-ins available to analyze the currently selected object in accordance with one or more embodiments of the invention.

FIG. 5 is an enlargement of panel 400 of FIG. 4 illustrating several plug-ins available to analyze the currently selected object (i.e., Building A) in accordance with one or more embodiments of the invention.

The location plug-in 502 contains the display and overrides to the geospatial location and position information for the building. In this regard, if location panel 502 were expanded, the user would have the option of specifying where Building A is located. For example, the user can specify the latitude, longitude, and elevation. Alternatively, the user can enter an address (e.g., number, street, city, state, and/or zip, etc.). Further, entering information in one field of the location panel 502 may automatically retrieve and output information in another field (e.g., entry of an address may automatically fill in the corresponding latitude, longitude, and elevation. In addition, once the location information is entered, the object (e.g., Building A 402) would automatically move to the location specified. The resulting visualization from the location plug-in 502 provides a visual representation of Building A 402 in a 3D environment.

The occupancy plug-in 504 allows the user to establish the current number of occupants 504A to be displayed and overrides 504B (i.e., the maximum number of occupants) to the number of occupants for Building A 402. The visualization of the occupancy plug-in 504 would provide for multiple dots indicative of persons in Building A 402 (or distributed throughout building A 402).

The utilities plug-in 506 contains the display and overrides to the utility usage (i.e., water and power) for Building A 402. The visualization of the utilities plug-in results in line or effect simulating power and water usage in Building A 402.

The greenhouse emissions plug-in 508 contains the display and overrides to the LEED (Leadership in Energy and Environmental Design green building rating system) emissions impact score for the Building A 402. The values on greenhouse emissions panel 508 are automatically (i.e., without additional user input) updated based on the occupancy (panel 504) and utility consumption (panel 506) for a selected building. Alternatively, the user may have the options of setting the greenhouse emissions values in panel 508 and the system can automatically adjust either the occupancy values 504 or utility values 506 that are necessary to reach the greenhouse emissions values set forth in panel 508. In this regard, the user can determine which values/panels (502, 504, 506, and 508) are locked and which can be adjusted depending on the values specified in the other panels. The visualization of greenhouse emissions plug-in 508 would result in a halo type effect displayed around and emanating from Building A 402.

Accordingly, developers and plug-in authors can harness to the full power of 3D rendering to convey the results of their calculations. In this regard, the 3D simulation illustrated in FIG. 4 may change its coloring or areas displayed based on the visualizations resulting from plug-ins 402-508. Check boxes 502C-508C may be utilized to determine whether a resulting visualization for the respective plug-in 502-508 is displayed in the 3D rendering of FIG. 4. For example, the user may check boxes (e.g., check boxes 502C, 504C, 506C, and 508C) within panel 400 to determine which plug-ins will be reflected in the display of building A 402 of FIG. 4. This allows users to visualize and analyze their data in new and powerful ways.

One or more embodiments of the invention use plug-ins to create animations that simulate results over time (4D). In addition, plug-ins can be used to simulate human behavior in the 3D environment. Given some human interaction and a stimulus in that environment, the plug-in architecture allows a user to predict and visualize certain human behaviors. The architecture also allows the user to visualize different temporal simulations like the sun and moon, weather patterns and phenomena such as tornadoes and snowfall (see detailed examples below).

Visual Bookmarking

One or more embodiments of the invention all the user to define scenarios that incorporate specific model and linked data overrides, plug-ins and their settings, and visualization traits. In other words, a group of settings are stored into a type of visual "bookmark" that allows the user to define specific "what-if" scenarios. Each scenario or "bookmark" captures specific model and linked data overrides supplied by the user, a set of plug-ins and their settings, and visualization parameters and traits.

By bookmarking scenarios and sub-scenarios with different settings, the user can quickly compare and analyze their information and make informed decisions. This essentially allows a user to save certain data sets, apply them to scenes <environments, geoviews> recall them and compare and contrast. In the prior art, to visualize and compare different scenarios, the users were required to modify a file, save it with a certain criteria, render it and repeat the process for each different scenario and comparing the final renderings. The ability to store the various settings into a bookmark is faster and interactive so the user is not required to save files using different settings.

Figure 6:
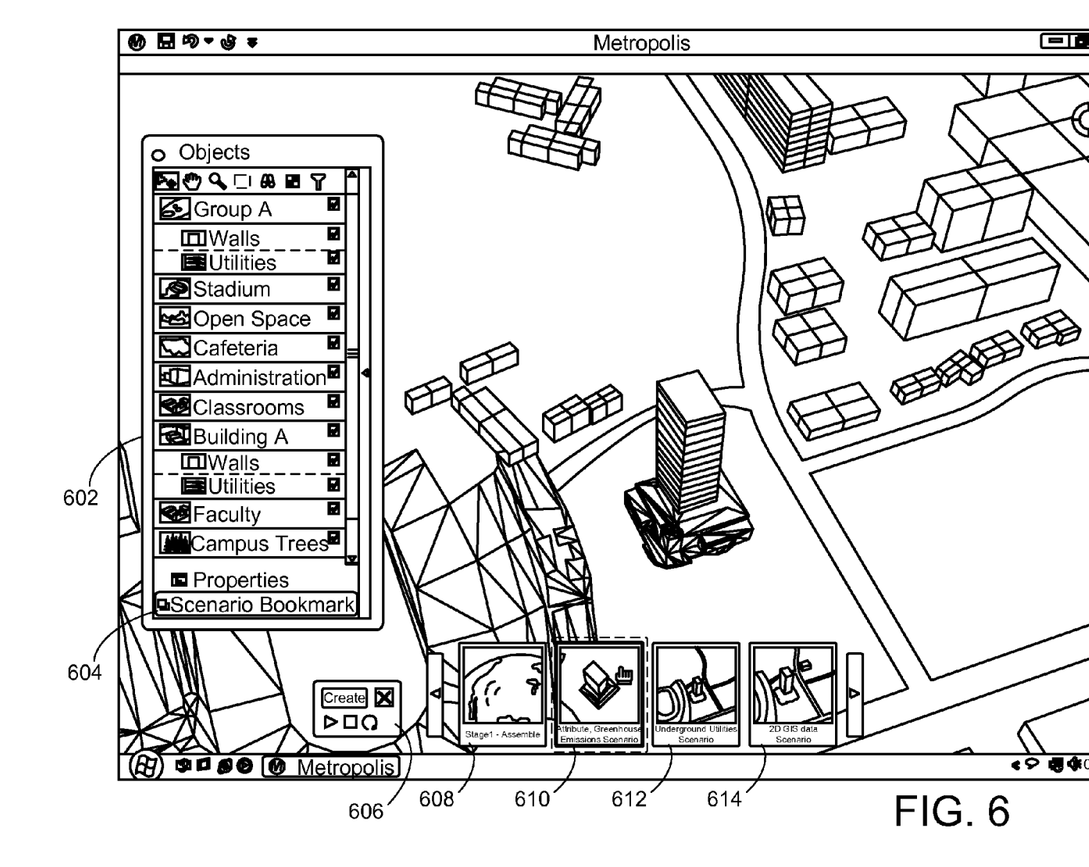
FIG. 6 illustrates various bookmarked scenarios that are selectable by a user in accordance with one or more embodiments of the invention.

FIG. 6 illustrates various bookmarked scenarios that are selectable by a user in accordance with one or more embodiments of the invention. The user first establishes all of the desired settings by selecting a particular data set, plug-ins and their settings, properties, data overrides, visualization traits, etc. in dialog box 602. Such values may be entered directly or can be linked by establishing a link between a property and an external file (e.g., a spreadsheet that contains values).

Alternatively, the user can select the scenario bookmark 604 in panel 602 which allows the user to select a set of predefined settings. Once the desired properties for a bookmark have been established (i.e., in dialog box/panel 602), the user can opt to create a bookmark to associate all of the settings with a bookmark, placeholder, or thumbnail for those settings using dialog box 606. Once created and if in the appropriate mode, the user may be presented with a group of selectable icons or menu options representative of the various bookmarks that have been established. For example, icons 608, 610, 612, and 614 are representative of various bookmarked scenarios that have been established by a user. Thus, each scenario represented by bookmarked icons 608-614 provides a selection of one or more plug-ins, and properties/settings that permit the user to define a particular visualization in a 3D/4D environment.

In view of the above, bookmarked scenarios can be viewed as a way of storing both a set of data (a specific set of models that have been loaded into a server) into a name, a set, with a series of plug-ins and potentially some overriding information for those plug-ins.

Sun/Shadow Plug-In

One example of a plug-in that may be used allows the user to directly control the sun/shadow settings for the time of day, and day of year while visualizing the results of such settings. In this regard, embodiments of the invention include an innovative control for both the direct control of and playback of sun/shadow simulations over specific days of year, and times of day.

Figure 7:
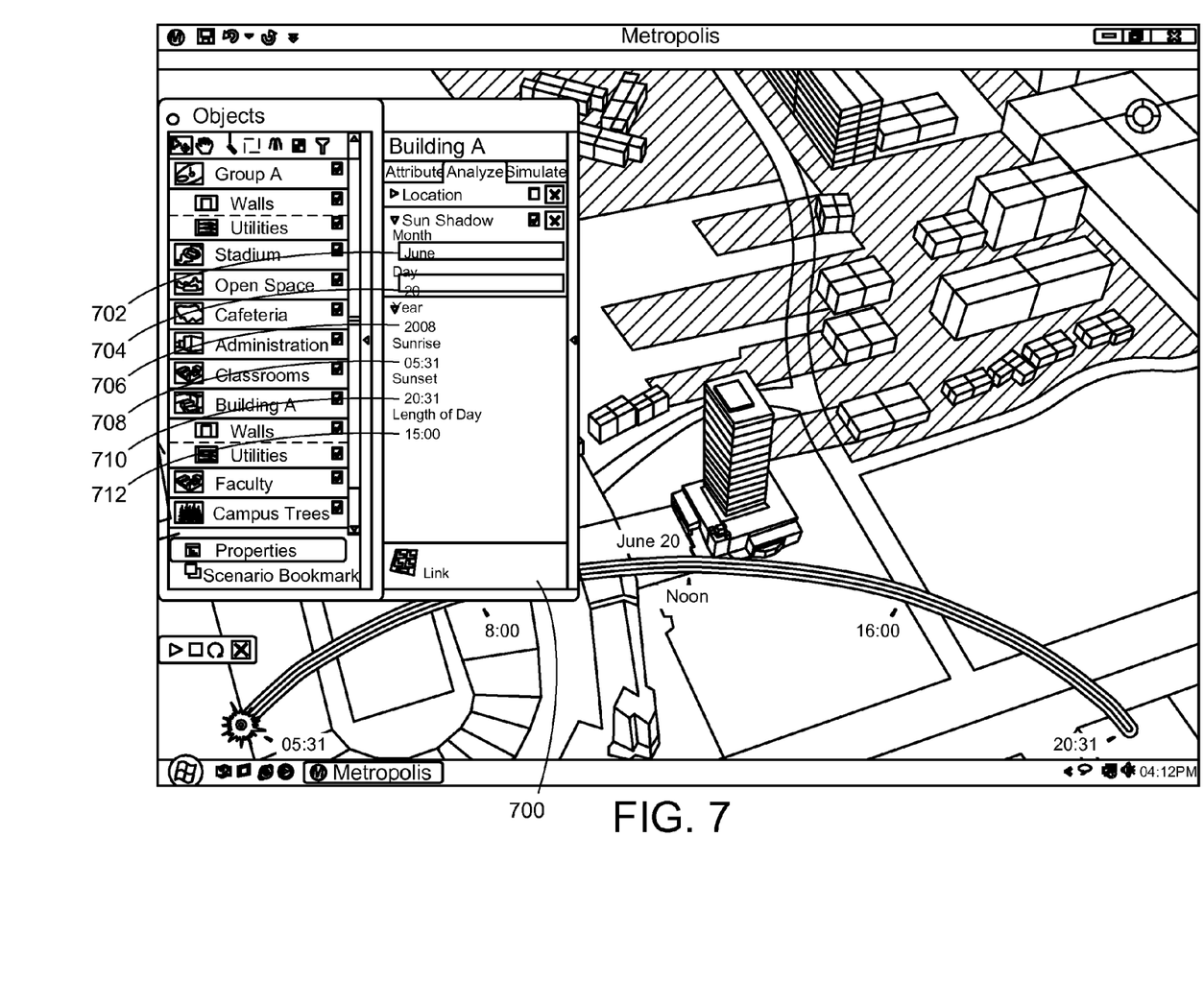
FIG. 7 illustrates a sun/shadow plug-in and onscreen control/settings in accordance with one or more embodiments of the invention.

FIG. 7 illustrates a sun/shadow plug-in and onscreen control/settings in accordance with one or more embodiments of the invention. As illustrated, the sun/shadow simulation plug-in 700 has settings for various sun settings. Settings may include a geographic location that can be derived from a selected object or central viewpoint. Alternatively, the user may specify the longitude, latitude, and elevation as described above.

Additional settings for the sun/shadow simulation plug-in 700 includes settings for the month 702, day, 704, and year 206. In response to setting the month, day, and year, the plug-in 700 may utilize the location information to determine/calculate the sunrise 708, sunset 710, and length of day 712. Alternatively, the user can manually enter the information in all of the fields 702-712 as desired (e.g., while ignoring the location information).

Figure 8A:
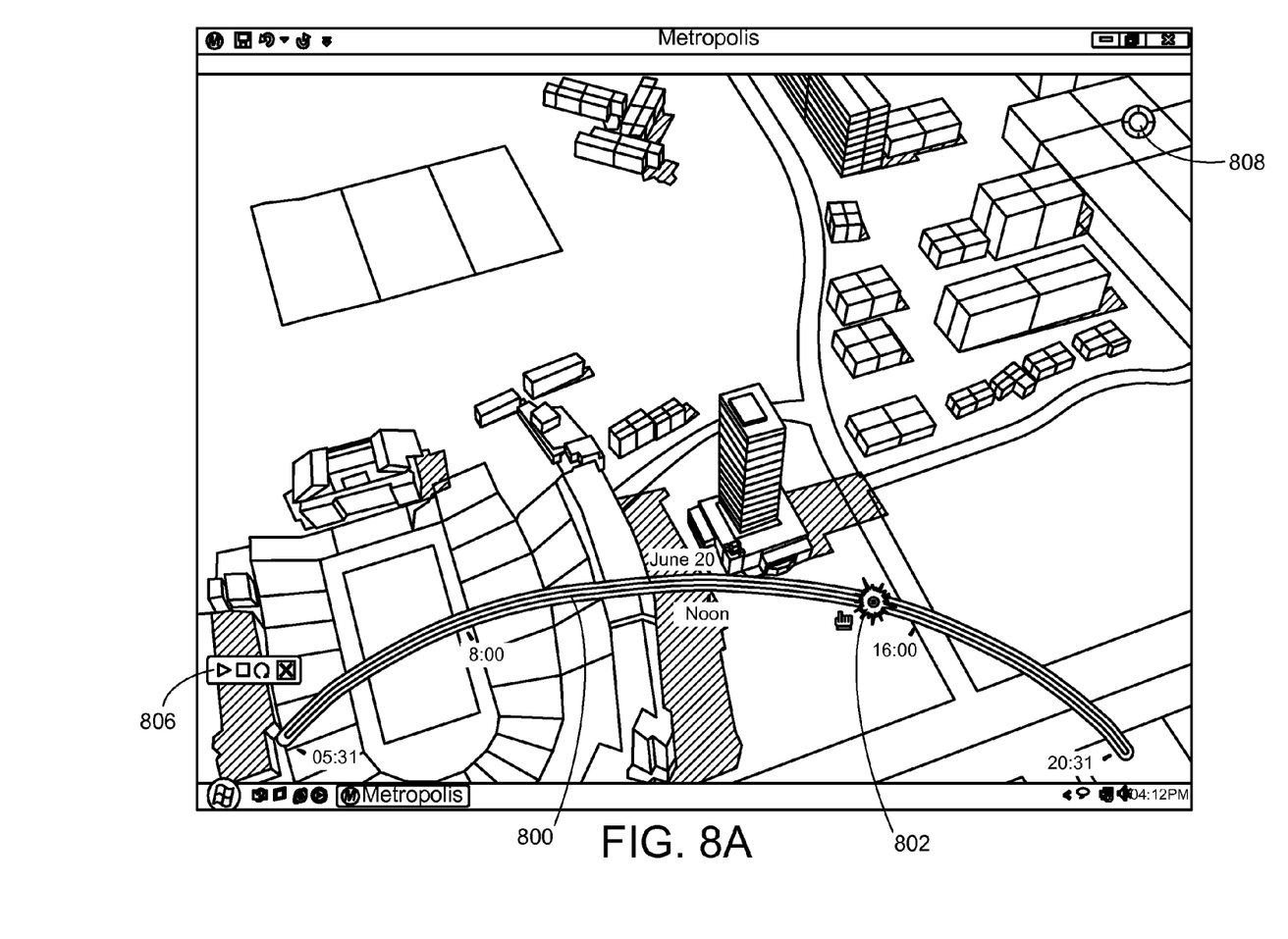
FIG. 8A illustrates the sun/shadow simulation for June $20^{th}$ in accordance with one or more embodiments of the invention.
Figure 8B:
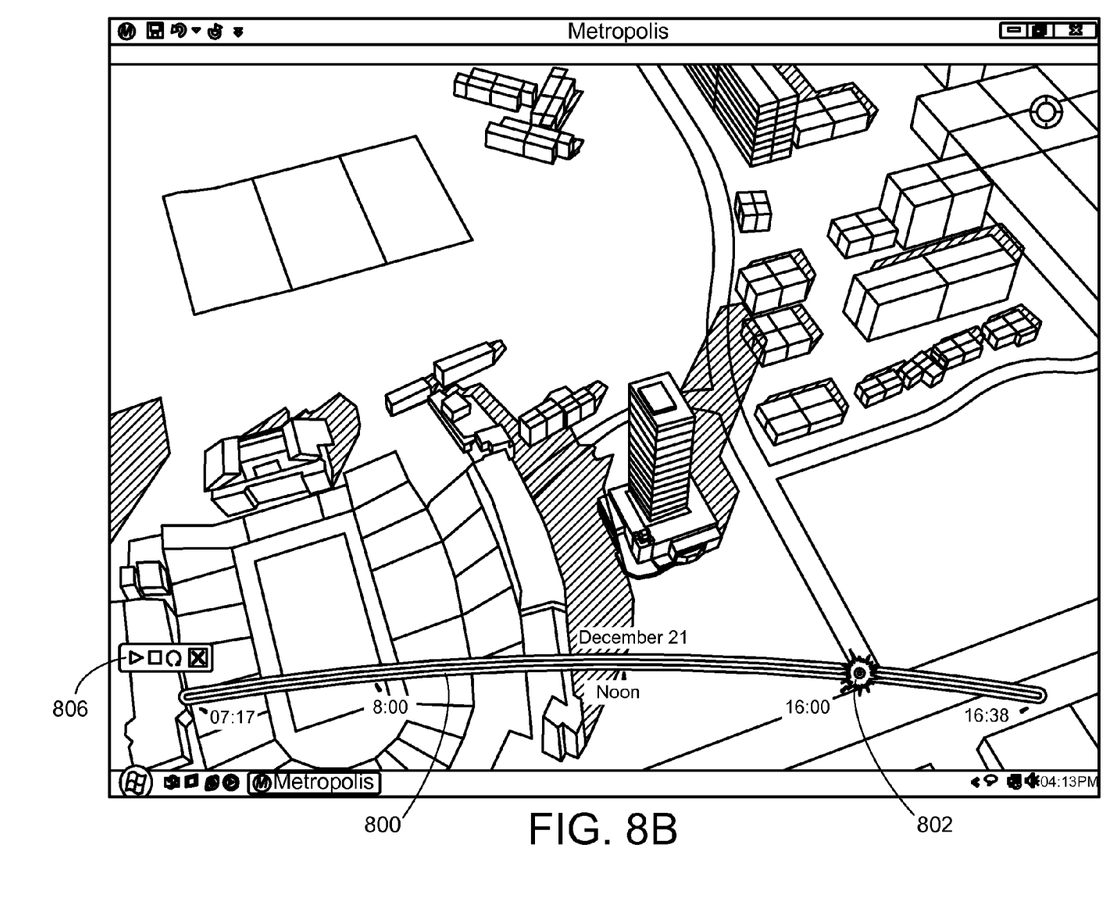
FIG. 8B illustrates the sun/shadow simulation for December $21^{st}$ in accordance with one or more embodiments of the invention.

It should be noted that while the user can manually enter the information in fields 702-712, the information may also be altered graphically. FIG. 8A illustrates the sun/shadow simulation for June 20$^{th}$ while FIG. 8B illustrates the sun/shadow simulation for December 21$^{st}$. Referring to FIGS. 8A and 8B, the user can directly control the day of year by dragging the timeline arc 800 higher (overhead summer sun) (as in FIG. 8A) and lower (horizon winter sun) (as in FIG. 8B) on the screen. As the user drags the arc 800, a date label (adjacent to the arc 800 [illustrated directly above the center of the arc 800 in FIGS. 8A and 8B]) dynamically reflects the current day of year (see text label June 20$^{th}$ in FIG. 8A and December 21 in FIG. 8B). Further, as the date changes, the sunrise and sunset labels (e.g., below the timeline 800) will automatically and dynamically change based on the calculations and settings established. Thus, depending on the date, the sunrise and sunset times may change and be automatically reflected by the labels in the timeline arc 800 which may have default values for the sunrise/sunset times.

As settings are established, one can view shadows or simulations of the shadows in the visualization of the digital city geo-spatial system illustrated. Such shadow rendering (as illustrated in FIGS. 8A and 8B) is operational during the date change (e.g., when the arc 800 is dragged), allowing the user to visualize the effect of the sun/shadows for a specific time of day over seasons.

Accordingly, once the settings have been established, the user has the ability to view a simulation of the sun and shadows cast in a 4D manner (i.e., the fourth dimension being time). In this regard, the timeline arc 800 allows the user to move a timeline slider 802 across the timeline arc 800 and view the resulting simulation based on the settings established. Thus, the user can use the playback buttons 806 to start, stop, and restart the simulation over time. When started using control 806, the timeline slider 802 moves from the beginning to the end of the arc 800 while the sun and shadows cast therefrom are simulated in the virtual scene that is displayed. The user is also free to drag the timeline slider 802 across the length of the arc 800 to visualize shadows at a specific time of day.

In addition, playback control allows the user to drag (e.g., reposition) the start and stop endpoints of timeline arc 800 in order to simulate a shorter interval of sun/shadow than the full sunrise to sunset time period. Additional labels appear under the timeline arc when the endpoints are moved—allowing the user to dynamically set a specific start and stop time. For example, as illustrated in FIG. 8A, the labels are 05:31, 08:00, NOON, 16:00, and 20:31 indicating different times along the timeline arc 80.

In certain situations, a user might also want to know how much moonlight might be cast at a certain time of the night during a particular season. During the summer, the amount of light might be different from the winter due to the possibility of snow being on the ground. In another scenario, the phases of the moon can be simulated in order to determine the tide.

This type of information might be of interest to a builder near the ocean or a waterway near the ocean.

In addition to the above, embodiments of the invention allow the user to modify the position or angle the user is viewing from. In this regard, the user can utilize icon 808 to reposition the perspective of the user within the 3D scene to allow the user to view shadows from multiple different positions/perspectives including directly above, from behind a building, from on a particular floor of the building, etc. Alternative methods for changing the position and/or perspective of the user are intended to fall within the scope of the present invention.

Logical Flow

Figure 9:
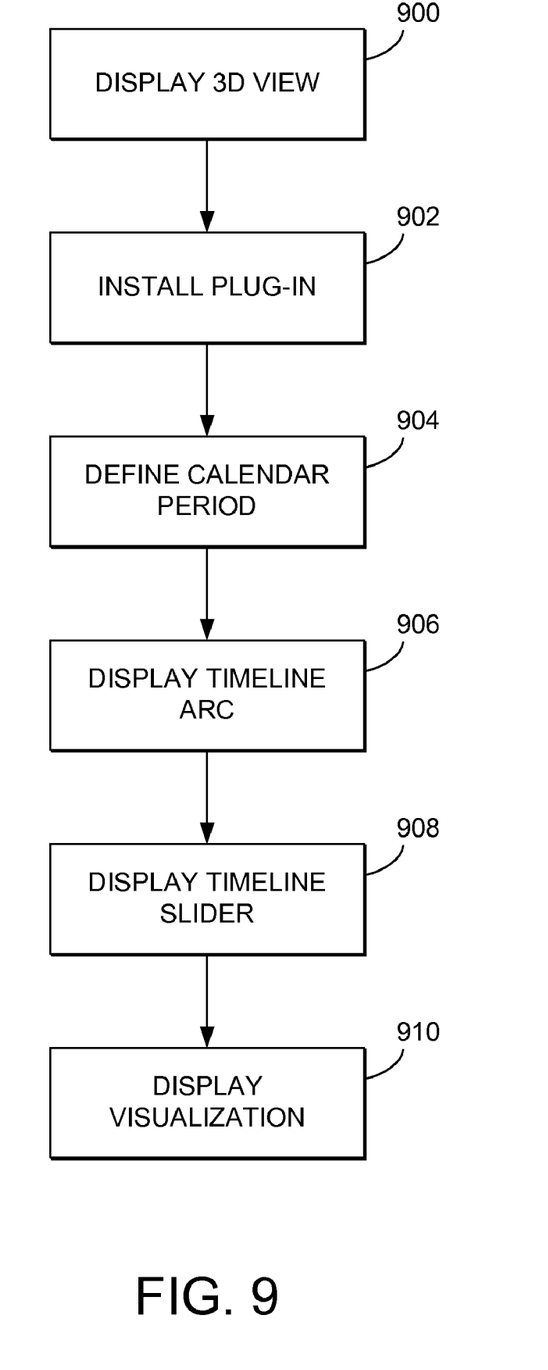
FIG. 9 is the logical flow for displaying a sun and shadow simulation in a 3D system in accordance with one or more embodiments of the invention.

FIG. 9 is the logical flow for displaying a sun and shadow simulation in a 3D system in accordance with one or more embodiments of the invention. At step 900, using a 3D graphics application, a 3D view of a real world scene is displayed on a display device.

At step 902, a plug-in is installed into the 3D graphics application. As used herein, the plug-in is the sun/shadow simulation plug-in.

At step 904, a user defines, for the plug-in a calendar period comprising a month, day, and year. The user may define the calendar period using a number of different methodologies. In one example, settings with a month field, a day field, and a year field are displayed in a panel of the graphics application. The user can then input the desired calendar information into the appropriate field. Alternatively, the timeline arc can be dragged by the user to modify the radius of the arc. A smaller radius (i.e., the arc is raised higher thereby curving the arc more) reflects a calendar period in a summer solstice while a larger radius (i.e., the arc is lower with less curvature [as it approaches a straight line]) reflects a period in a winter solstice. As the user defines the calendar period, labels that are proximate/adjacent to the timeline arc are automatically (i.e., without additional user input) and dynamically updated. Thus, as the user is dragging the arc, the labels will dynamically and automatically update such that the user has feedback regarding the calendar period being defined. Such labels may provide month, day and/or year indicators for the calendar period of timeline arc.

At step 906 (and consistent with the calendar period being defined in step 904) (i.e., the order of steps 904 and 906 may be interchangeable), a timeline arc is displayed. The calendar period defines the radius of the arc, and a starting endpoint and stopping endpoint of the timeline arc define an interval of time during the calendar period. Such an interval of time may be sunrise to sunset or another period of time established/defined by the user. The user can adjust/modify the interval of time merely by modifying the starting endpoint or stopping endpoint (e.g., by dragging a endpoints using a cursor control device).

At step 908, a timeline slider, that indicates a time of day, is displayed on the timeline arc.

At step 910, a visualization is displayed, in the 3D view, of shadows cast by a sun on objects in the 3D view. The position of the sun in the visualization is based on the calendar period (e.g., specified in the timeline arc) and time of day (specified by the timeline slider). The visualization may further consist of a playback simulation where the timeline slider is automatically (i.e., without additional user input) moved across the timeline arc such that the position of the sun and the visualization is automatically and dynamically updated as the slider moves across the timeline arc. In other words, the user can use playback control to have the timeline slider move across the timeline arc at a defined rate (such a rate may be specified by the user) wherein during such playback, the shadows and sun position are automatically and dynamically updated in synchronization with the timeline slider movement. Such a playback operation can effectively allow the user to view the shadows cast from sunrise to sunset during a particular time of year (i.e., the defined calendar period). Further, while the user is dragging the timeline arc at step 906 (i.e., to modify the radius), the visualization may also automatically and dynamically update so that the user can visualize the shadows at a particular time over seasons.

In addition, during step 910, the user can modify the viewpoint/perspective of the user within the visualization by identifying a new user location (e.g., a different location in 3D space). Identifying the 3D location may be conducted by the user clicking in a desired location in the 3D space, specifying a geospatial location (e.g., using latitude, longitude, and elevation coordinates), or using any type of tool or widget to manipulate and change the user's location and/or perspective.

While the above logical flow is described with respect to sun/shadows, similar steps can be used to simulate moonlight and/or phases of the moon and the resulting tide flow.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method for displaying a sun and shadow simulation in a three-dimensional system, comprising:
   displaying, using a three-dimensional (3D) graphics application, a 3D view of a real world scene on a display device;
   installing a plug-in into the 3D graphics application;
   receiving input from a user defining, for the plug-in, a calendar period comprising a month, day, and year;
   displaying, in the 3D view, a timeline arc, wherein the calendar period defines a radius of the arc, and a starting endpoint and a stopping endpoint of the timeline arc define an interval of time during the calendar period, wherein the user defines the calendar period by dragging, using a cursor control device, the timeline arc to modify the radius of the arc;
   displaying, on the timeline arc, a timeline slider that indicates a time of day; wherein movement of the timeline arc slider on the timeline arc modifies the time of day; and
   displaying, in the 3D view, a visualization of shadows cast by a sun on objects in the 3D view, wherein a position of the sun in the visualization and the simulated shadows cast are based on the calendar period and the time of day indicated by the timeline arc slider.

2. The method of claim 1, wherein the user defines the calendar period by:

displaying, in a panel of the graphics application, one or more settings for the plug-in, wherein the one or more settings comprise a month field, a day field, and a year field;

receiving input from a user inputting calendar information into the month field, the day field, and the year field.

3. The method of claim 1, wherein a smaller radius reflects a calendar period in a summer solstice and a larger radius reflects a calendar period in a winter solstice.

4. The method of claim 1, wherein date labels proximate to the timeline arc are automatically and dynamically updated as the user defines the calendar period.

5. The method of claim 1, further comprising modifying the starting endpoint or the stopping endpoint of the timeline arc to modify the interval of time.

6. The method of claim 1, further comprising a playback simulation wherein the timeline arc slider is automatically moved across the timeline arc such that the position of the sun and the visualization is automatically and dynamically updated as the timeline arc slider moves across the timeline arc.

7. The method of claim 1, further comprising modifying a viewpoint of the user within the visualization by identifying a new user location.

8. An apparatus for displaying a sun and shadow simulation in a three-dimensional system in a computer system comprising:

(a) a computer having a memory;
(b) an application executing on the computer, wherein the application is configured to:

(i) displaying, using a three-dimensional (3D) graphics application, a 3D view of a real world scene on a display;
(ii) installing a plug-in into the 3D graphics application;
(iii) receiving input from a user defining, for the plug-in, a calendar period comprising a month, day, and year;
(iv) displaying, in the 3D view, a timeline arc, wherein the calendar period defines a radius of the arc, and a starting endpoint and a stopping endpoint of the timeline arc define an interval of time during the calendar period, using a cursor control device, the timeline arc to modify the radius of the arc;
(v) displaying, on the timeline arc, a timeline arc slider that indicates a time of day, wherein movement of the timeline arc slider on the timeline arc modifies the time of day; and
(vi) displaying, in the 3D view, a visualization of simulated shadows cast by a sun on objects in the 3D view, wherein a position of the sun and the simulated shadows cast in the visualization are based on the calendar period and the time of day indicated by the timeline arc slider.

9. The apparatus of claim 8, wherein the user defines the calendar period by:

displaying, in a panel of the graphics application, one or more settings for the plug-in, wherein the one or more settings comprise a month field, a day field, and a year field;

receiving input from a user inputting calendar information into the month field, the day field, and the year field.

10. The apparatus of claim 8, wherein a smaller radius reflects a calendar period in a summer solstice and a larger radius reflects a calendar period in a winter solstice.

11. The apparatus of claim 8, wherein date labels proximate to the timeline arc are automatically and dynamically updated as the user defines the calendar period.

12. The apparatus of claim 8, wherein the application is further configured to modify the starting endpoint or the stopping endpoint of the timeline arc to modify the interval of time.

13. The apparatus of claim 8, wherein the application is further configured to conduct a playback simulation wherein the timeline arc slider is automatically moved across the timeline arc such that the position of the sun and the visualization is automatically and dynamically updated as the timeline arc slider moves across the timeline arc.

14. The apparatus of claim 8, wherein the application is further configured to modify a viewpoint of the user within the visualization by identifying a new user location.

15. An article of manufacture comprising a program storage device readable by a computer, tangibly embodying at least one program of instructions executable by the computer to perform method steps of displaying a sun and shadow simulation in a three-dimensional system, the method steps comprising the steps of:

displaying, using a three-dimensional (3D) graphics application, a 3D view of a real world scene on a display device;

installing a plug-in into the 3D graphics application;

receiving input from a user defining, for the plug-in, a calendar period comprising a month, day, and year;

displaying, in the 3D view, a time line arc, wherein the calendar period defines a radius of the arc, and a starting endpoint and a stopping endpoint of the timeline arc define an interval of time during the calendar period, wherein the user defines the calendar period by dragging, using a cursor control device, the timeline arc to modify the radius of the arc;

displaying, on the time line arc, a time line arc slider that indicates a time of day, wherein movement of the timeline arc slider on the time line arc modifies the time of day; and displaying, in the 3D view, a visualization of simulated shadows cast by a sun on objects in the 3D view, wherein a position of the sun in the visualization and the simulated shadows cast are based on the calendar period and the time of day indicated by the timeline arc slider.

16. The article of manufacture of claim 15, wherein the user defines the calendar period by:

displaying, in a panel of the graphics application, one or more settings for the plug-in, wherein the one or more settings comprise, a month field, a day field, and a year field;

receiving input from a user inputting calendar information into the month field, the day field, and the year field.

17. The article of manufacture of claim 15, wherein a smaller radius reflects a calendar period in a summer solstice and a larger radius reflects a calendar period in a winter solstice.

18. The article of manufacture of claim 15, wherein date labels proximate to the timeline arc are automatically and dynamically updated as the user defines the calendar period.

19. The article of manufacture of claim 15, further comprising modifying the starting endpoint or the stopping endpoint of the timeline arc to modify the interval of time.

20. The article of manufacture of claim 15, further comprising a playback simulation wherein the timeline arc slider is automatically moved across the timeline arc such that the position of the sun and the visualization is automatically and dynamically updated as the timeline arc slider moves across the timeline arc.

21. The article of manufacture of claim 15, further comprising modifying a viewpoint of the user within the visualization by identifying a new user location.

* * * * *